United States Patent
Safford et al.

(10) Patent No.: US 6,681,322 B1
(45) Date of Patent: Jan. 20, 2004

(54) METHOD AND APPARATUS FOR EMULATING AN INSTRUCTION SET EXTENSION IN A DIGITAL COMPUTER SYSTEM

(75) Inventors: Kevin David Safford, Fort Collins, CO (US); Patrick Knebel, Ft Collins, CO (US)

(73) Assignee: Hewlett-Packard Development Company L.P., Houston, TX (US)

( * ) Notice: Subject to any disclaimer, the term of this patent is extended or adjusted under 35 U.S.C. 154(b) by 0 days.

(21) Appl. No.: 09/449,846

(22) Filed: Nov. 26, 1999

(51) Int. Cl.[7] ................................................. G06F 9/00
(52) U.S. Cl. ....................... 712/244; 712/218; 712/215
(58) Field of Search ............................ 712/244, 218, 712/215, 214; 703/28

(56) References Cited

U.S. PATENT DOCUMENTS

| | | | |
|---|---|---|---|
| 4,736,289 A | * | 4/1988 | Eaton .......................... 712/229 |
| 5,721,857 A | * | 2/1998 | Glew et al. ................... 712/23 |
| 5,859,999 A | | 1/1999 | Morris et al. |
| 5,860,017 A | | 1/1999 | Sharangpani et al. |
| 6,085,312 A | * | 7/2000 | Abdallah et al. ........... 712/208 |
| 6,233,671 B1 | * | 5/2001 | Abdallah et al. ........... 712/221 |

OTHER PUBLICATIONS

Alexander Wolfe, "Techniques of predication and speculation detailed", Electronic Engineering Times, Feb. 1999.

* cited by examiner

Primary Examiner—Eddie Chan
Assistant Examiner—Charles Harkness

(57) ABSTRACT

Methods for emulating an instruction set extension, comprising providing data to be operated upon, executing a first instruction with respect to a first portion of the data without committing the results of the first executed instruction, if no unmasked exceptions occur with respect to the first portion of the data, executing a second instruction with respect to a second portion of the data, and if no unmasked exceptions occur with respect to the second portion of the data, committing the results of the second executed instruction and again executing the first instruction with respect to the first portion of the data. If the first instruction is executed again, its results are committed. A handler is invoked if an unmasked exception occurs.

18 Claims, 5 Drawing Sheets

METHOD AND APPARATUS FOR EMULATING AN INSTRUCTION SET EXTENSION IN A DIGITAL COMPUTER SYSTEM

I. FIELD

The present invention relates to digital computer systems, and more particularly, but not by way of limitation, to methods and apparatus for executing instructions in such systems.

II. BACKGROUND

The Streaming Single-Instruction Multiple-Data Extensions (SSEs) have been developed to enhance the instruction set of the latest generation of certain computer architectures (e.g., the IA-32 architecture). The SSEs include a new set of registers, new floating point data types, and new instructions. Specifically, the SSEs comprise eight 128-bit single-instruction multiple-data (SIMD) floating point registers (XMM0 through XMM7) that can be used to perform calculations and operations on floating point data. These XMM registers are shown in FIG. 1A. Each 128-bit floating point register can contain four packed 32-bit single precision (SP) floating point numbers. The structure of the packed 32-bit SP floating point numbers is illustrated in the example of FIG. 1B, where four 32-bit SP floating point numbers (numbered 0 through 3) are shown as if stored in the XMM2 SSE register. In architectures designed to support the SSEs (i.e., its native architecture), a single instruction in the SSE instruction set operates in parallel on the four 32-bit SP floating point numbers in a particular XMM register.

The SSEs also include a status and control register called the MXCSR register. The format of the MXCSR is illustrated in the example of FIG. 1C. The MXCSR register may be used to selectively mask or unmask exceptions. Specifically, bits 7–12 of the MXCSR register may be used by a programmer to selectively mask or unmask a particular exception. Masked exceptions are those exceptions that a programmer wishes to handled automatically by the processor which may provide a default response. Unmasked exceptions, on the other hand, are those exceptions that the programmer wishes to be handled by invocation of an interrupt or operating system handler. This invocation of the handler transfers control to the operating system (e.g., Windows by Microsoft), where the problem may be corrected or the program terminated.

The MXCSR register may also be used to keep track of the status of exception flags. Bits 0–5 of the MXCSR register indicate whether any of six exceptions—invalid operation (I), divide-by-zero (Z), denormal operand (D), numeric overflow (O), numeric underflow (U), or inexact result (P)—have occurred in the execution of a SSE instruction. (Note that in the example of FIG. 1C, all exception flags have been raised for one reason or another—indicated by "E"). The status flags are "sticky" meaning that once they are set, they are not cleared by any subsequent SSE instruction, even one performed without exception. The status flags can only be cleared by a special instruction usually issued from the operating system.

The exception flags of FIG. 1C are the result of a bitwise logical-OR operation on all four of the 32-bit SP floating point operations that are performed on a particular 128-bit register XMM register (one operation on each of the four 32-bit SP floating point numbers). Thus, if an exception occurs as to any one of the four 32-bit SP floating point numbers, the exception flag for that particular type of exception will be raised indicating some type of problem has occurred in the system. The invalid operation (I), divide-by-zero (Z), and denormal operand (D) exceptions are pre-computation exceptions, meaning that they are detected before any arithmetic or logical operations occur (i.e., can be detected without doing any computations), and the other three exceptions, numeric overflow (O), numeric underflow (U), and inexact result (P) are post-computation exceptions meaning that they are detected after operations have been performed. It is possible for an operation performed on a suboperand (i.e., one of the four operands in a 128-bit XMM register) to raise multiple flags.

The native architecture of the SSEs has the following rules for exceptions:

1. When an unmasked exception occurs, the processor executing the instruction will not change the contents of the XMM register. In other words, results will not be committed or stored until it is known that no unmasked exceptions have occurred with respect to any of the four 32-bit SP floating point numbers.

2. If there is a masked exception, all exception flags are updated.

3. In the case of unmasked pre-computation exceptions, all flags relating to pre-computation exceptions, whether masked or unmasked, will be updated. However, no subsequent computations are permitted, meaning that no post-execution exceptions can or will occur. This, of course, means that no post-execution exception flags will change or be updated.

4. In the case of unmasked post-computation exceptions, all post-execution conditions, whether masked or unmasked, will be updated, as will all pre-computation exceptions. Any pre-computation exceptions will be masked exceptions only because, if the pre-computation exception was unmasked, under rule number 3 above, no further computations would have been permitted.

More information regarding Streaming SIMD Extensions may be found in the Intel Architecture Software Developer's Manual, Volumes 1–3, which are hereby incorporated by reference.

In many architectures, provisions have not been made for the SSE instructions. In these non-native architectures, the eight 128-bit floating point XMM registers capable of containing four 32-bit SP floating point numbers are not available. In some non-native architectures, the eight 128-bit XMM registers may be mapped onto sixteen floating point registers (e.g., IA-64 registers) that may be less than 128 bits and more than 64 bits wide. Specifically, some architectures use 82-bit registers to hold two 32-bit SP floating point numbers (the bits in excess at 64 may be used for the special encoding used to indicate that the register holds SIMD-type 32-bit SP floating point numbers). An example is shown in FIG. 1D. Note that the four 32-bit SP floating point numbers 0–3 stored in the XMM2 register of the SSE native environment (FIG. 1B) are now stored in two 82-bit registers, XMM2_Low and XMM2_High, containing the "low half" of the XMM2 register and "high half" of the XMM2 register, respectively. This makes parallel execution of an operation on each of the four 32-bit SP floating point numbers difficult.

Thus, in this non-native environment, the SSE instructions must be executed by emulation. Specifically, operations may first be performed on two of the four 32-bit SP floating point numbers (in parallel) and then be performed on the remaining two 32-bit SP floating point numbers (again, in parallel). (Operations may alternatively be performed on only one or at least three of the 32-bit SP floating point numbers). For example, an operation may be performed on the operands in the "low half," XMM2_Low, and then on the "high half," XMM2_High. However, given the SSE rules for handling exceptions and updating exception flags, problems arise when emulating SSE instructions in this partially-parallel, partially-sequential manner. For example, consider a set of instructions being performed on the low half and high half, of FIG. 1D:

XMM2:=OP(XMM3, XMM4)

emulated by

XMM2_Low:=OP (XMM3_Low, XMM4_Low)
XMM2_High:=OP (XMM3_High, XMM4_High)

Assume that the first instruction is executed without an unmasked exception as to the operands in the low halves, XMM3_Low and XMM4_Low. The results of this operation are then properly committed in XMM2_Low. Assume now that execution of the second instruction on the high halves results in a pre-computation unmasked exception. According to the SSE rules, no subsequent operations are to be performed on any of the four 32-bit SP floating point numbers because of that pre-computation unmasked exception. But here, however, results of the operation on the low halves have been committed to register XMM2_Low in violation of the SSE rules. This corrupts the data in XMM2_Low and cannot be allowed to happen.

One way of successfully emulating the SSEs, and preventing this rule violation, is to use a "shadow" register mechanism. In a shadow register mechanism, the results of a previous, successful operation on the low halves are physically stored in a shadow register. In this case, in the example above, when the exception is detected on the high halves, the results previously stored in the shadow register for the previous operation on the low halves may be restored, i.e., an "undo" operation on the low halves is performed. This shadow register mechanism, however, is relatively complex. In most systems, there must be at least 16 registers available for storing the results of a previous operation on the low halves, and each must be capable of storing two 32bit floating point SP numbers. Additionally when an "undo" operation is required, it must be determined which of these shadow registers the desired results are in. This mechanism consumes valuable register space that could otherwise be used more efficiently. Furthermore, a relatively complicated system of pointers and virtual maps are required to store the previous results.

Another way to emulate a particular SSE instruction is to provide a backoff register mechanism. One skilled in the art will realize that this technique may require a plurality of registers, a multiplexer and demultiplexer combination, various other hardware, and a new set of instructions. All of these increase cost and reduce efficiency.

Yet another way to emulate a particular SSE instruction is to execute the instruction with respect to each of the four 32-bit SP floating point numbers in the SSE XMM register one at a time and store the results of each execution in temporary registers. When the instruction has been executed with respect to the fourth 32-bit SP floating point number, and no unmasked exceptions have occurred, the results may then be committed to the appropriate architectural location and exception flags updated. This method of emulation requires the addition of a relatively complex micro-code sequence and the use of hardware that could otherwise be used more efficiently, not to mention the amount of clock cycles it consumes in executing an instruction four times before results can be committed.

Clearly, there exists a need for methods and apparatus for emulating the SSE instruction set (and other instructions sets) that makes efficient use of existing hardware and that consumes relatively few clock cycles. Additionally, there exists a need for method and apparatus for determining whether certain problems may occur in the execution of a series of instructions without committing the results of those instructions.

III. SUMMARY

In one embodiment of the present invention there are provided methods for emulating an instruction set extension, comprising providing data to be operated upon, executing a first instruction with respect to a first portion of the data without committing the results of the first executed instruction, if no unmasked exceptions occur with respect to the first portion of the data, executing a second instruction with respect to a second portion of the data, and if no unmasked exceptions occur with respect to the second portion of the data, committing the results of the second executed instruction and again executing the first instruction with respect to the first portion of the data, and committing its results. A handler is invoked if an unmasked exception occurs on either of the first two instructions.

IV. BRIEF DESCRIPTION OF THE DRAWINGS

FIGS. 1A–D are a block diagrams of components of the SSEs.

V. DETAILED DESCRIPTION

A. Description of an Embodiment

Figure 1A:
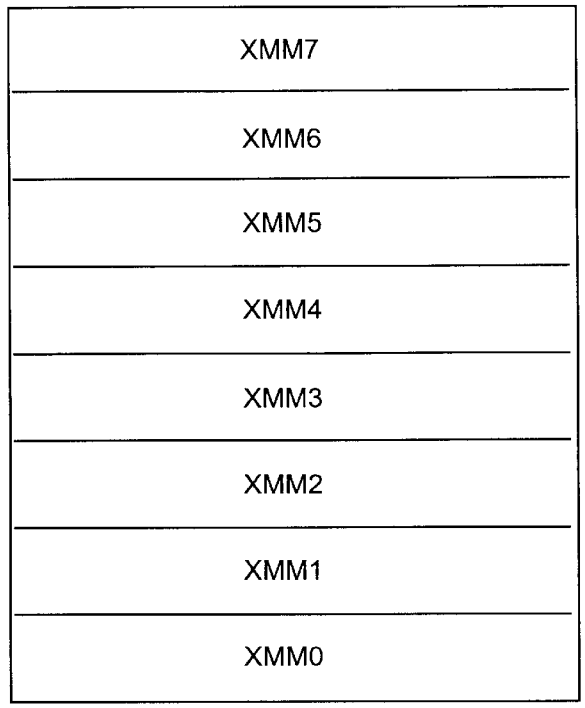
Figure 1B:
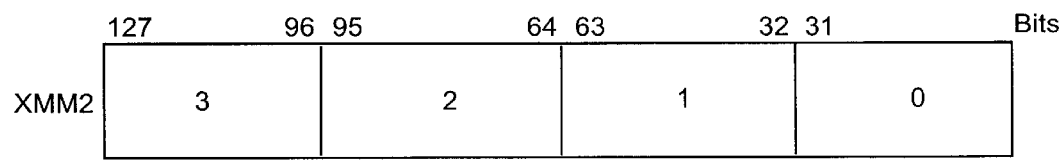
Figure 1C:
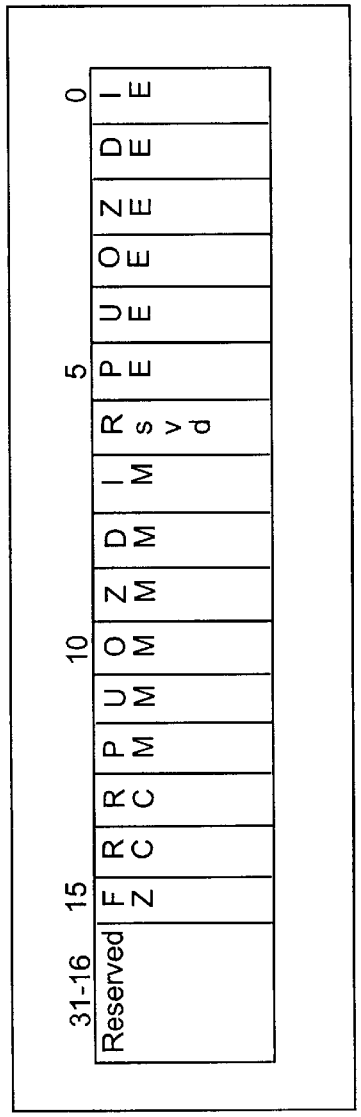
Figure 1D:
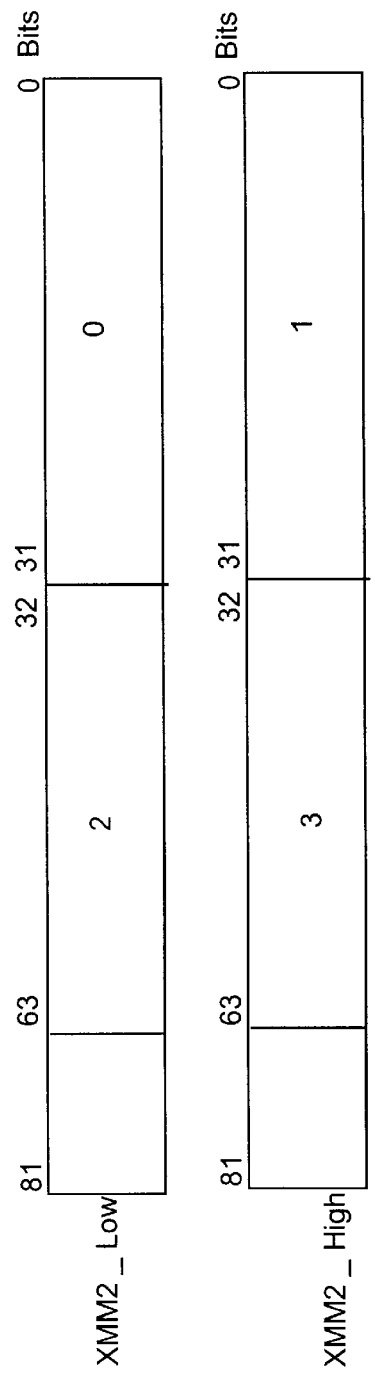
Figure 2:
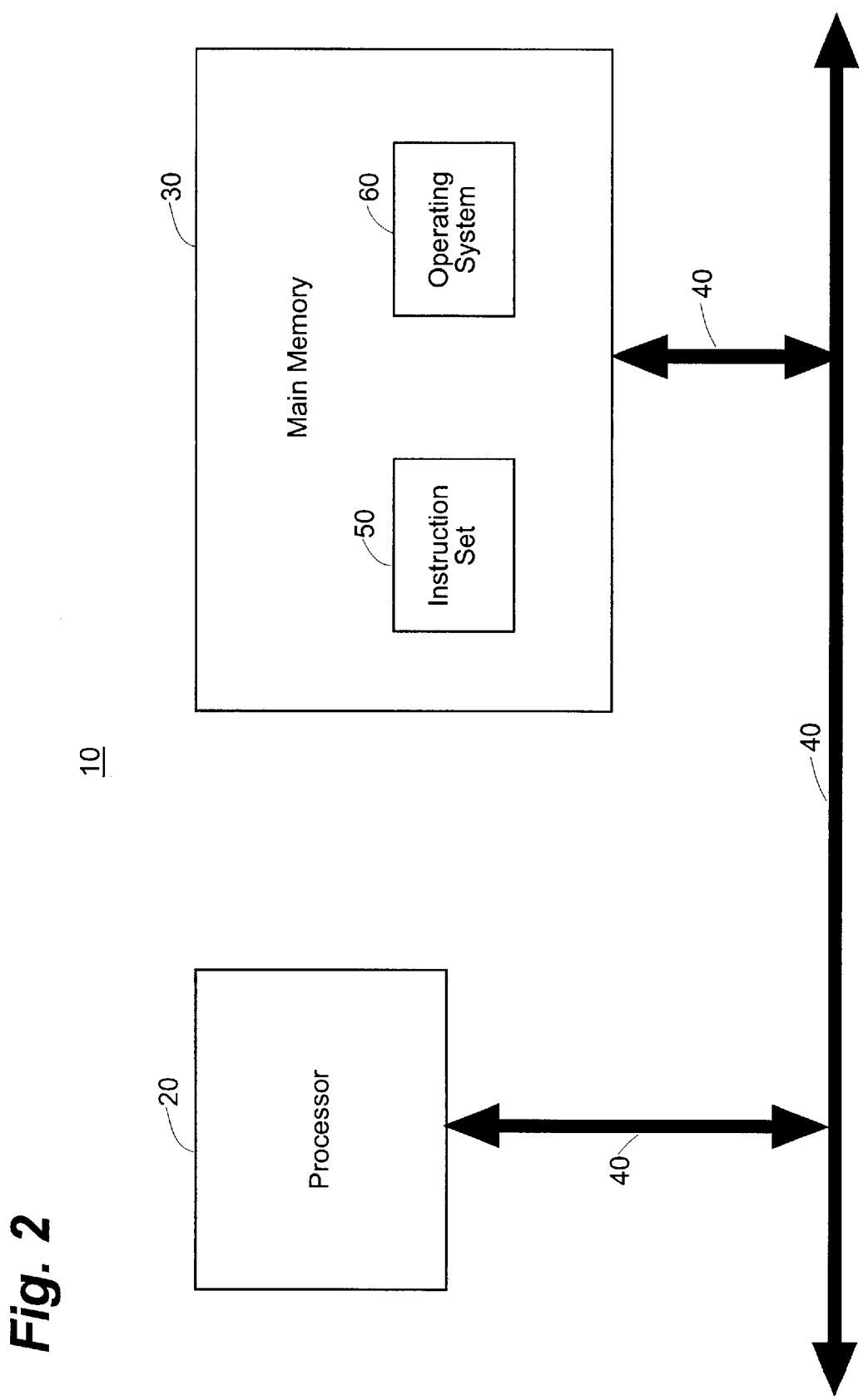
FIG. 2 is a block diagram of a computer system including the present invention.
Figure 3:
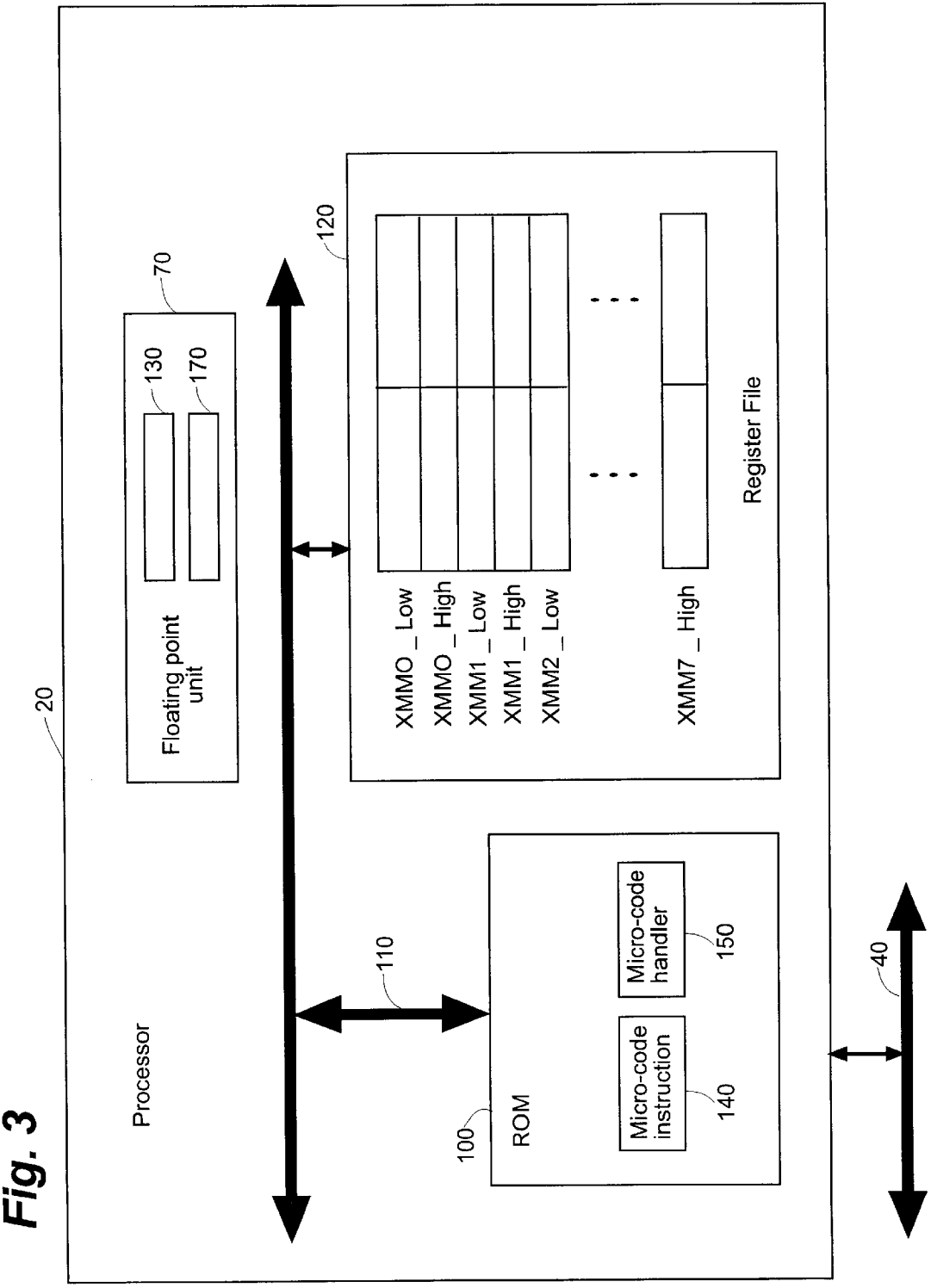
FIG. 3 is block diagram of the processor of FIG. 2.

FIG. 2 illustrates a computer system 10 in which the present invention may be implemented. The computer system 10 comprises at least one processor 20, main memory 30, and various interconnecting data, address, and control busses (numbered collectively as 40). An instruction set 50, which may include the SSEs, and an operating system 60 may be stored in main memory 30. As illustrated in FIG. 3, the processor 20 comprises a floating point unit 70, a micro-code ROM 100, various busses and interconnections (numbered collectively as 110) and a register file 120 comprising the sixteen floating point registers, XMM0_Low through XMM7_High, needed to emulate the SSE XMM registers. In one embodiment, the sixteen floating point registers are 82-bit registers, but other widths (e.g., 128-bit or 64-bit) may be used and the following description in terms of 82-bit registers is exemplary only, and not intended in a limiting sense. The four 32-bit SP floating point numbers of the SSEs may be stored in two of the 82-bit SP floating point registers of the present invention (e.g., XMM2_Low and XMM2_High, as illustrated in FIG. 1D). The floating point unit 70 comprises a first 32-bit register 130 that corresponds to the MXCSR register of the SSEs and second register 170 having at least 6-bits (one bit corresponding to each type of exception) for performing flag backup operations (described below).

Instructions are provided to the processor 20 from main memory 30. The instructions provided to the processor 20 are macro-code instructions that map to one or more micro-code instructions 140 stored in the micro-code ROM 100. The micro-code instructions can be directly executed by processor 20. Also stored in the micro-code ROM 100 are a set of micro-code handlers 150 that may be invoked to handle certain unmasked processor exceptions. The processor 20 may have a pipelined architecture and may allow for parallel processing of certain instructions.

B. Method of Operation

When emulating a SSE instruction in its native environment, a processor may be presented with the following macro-code instruction:

XMM2:=OP(XMM3, XMM4) wherein OP is the particular SSE instruction to be performed on the four 32-bit SP floating point numbers stored in the 128-bit floating point XMM2 register. This SSE instruction operates on the contents of the XMM3 and XMM4 registers and commits them to the XMM2 register.

1. Emulation and Committing Results

Figure 4:
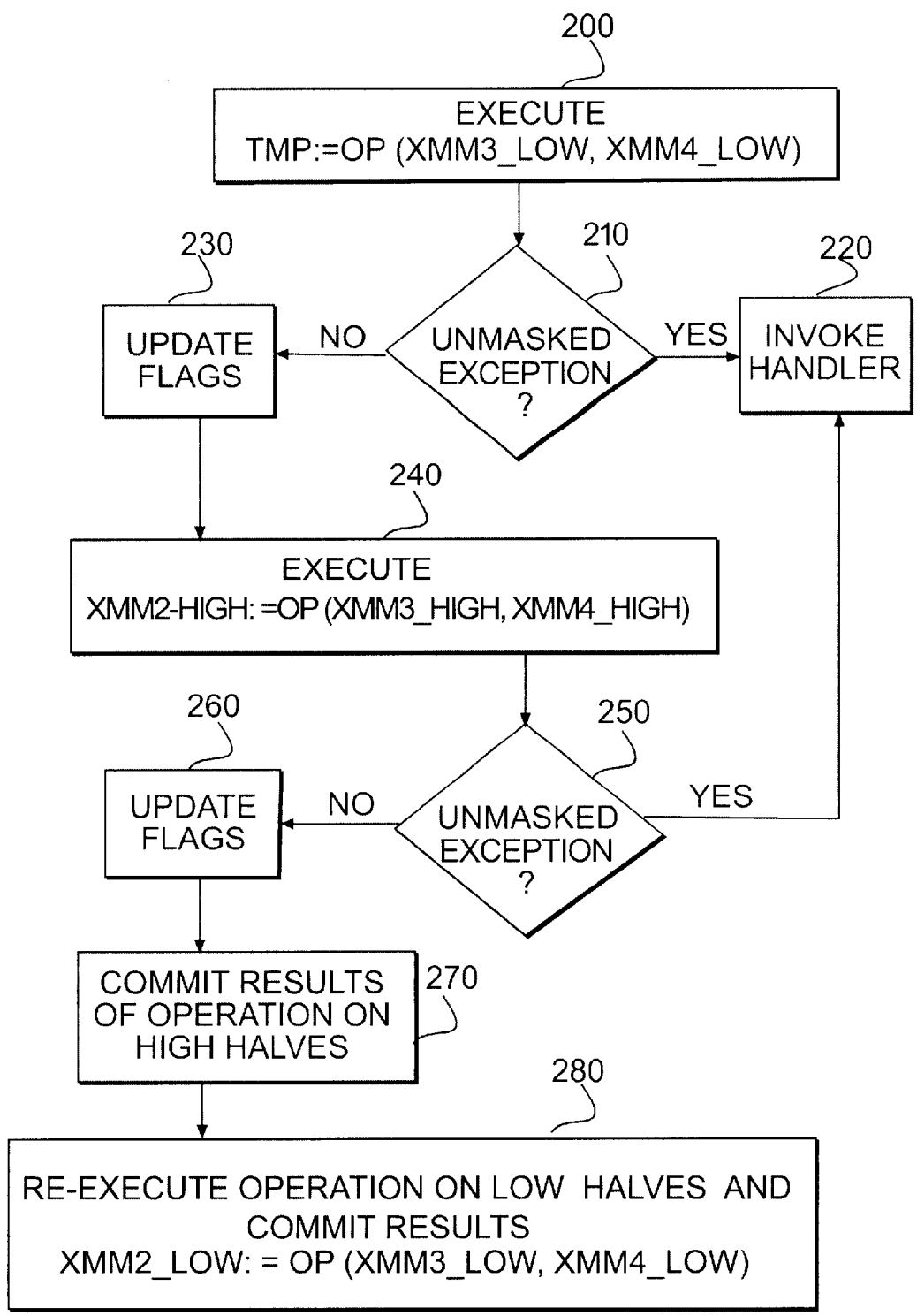
FIG. 4 is a flow chart of portions of the operation of the present invention.

To successfully emulate this instruction in a non-native architecture without violating any of the SSE rules relating to exceptions, the present invention issues the following instructions in micro-code:

TMP:=OP(XMM3_Low, XMM4_Low);

XMM2_High:=OP(XMM3_High, XMM4_High);

XMM2_Low:=OP(XMM3_Low, XMM4_Low);

The operation of computer system 10 with respect to these instructions is illustrated in FIG. 4. The purpose of the first instruction is to determine whether any unmasked exceptions will occur when the operation OP is performed on the low halves, XMM3_Low and XMM4_Low. See block 200 of FIG. 4. Note that no results are committed to an architectural register by this operation—in fact, the results of the operation are irrelevant and merely written to a temporary register by the first instruction. At block 210, if an unmasked exception has occurred, a micro-code handler 150 is invoked at block 220 and the unmasked exception is dealt with there. If, however, no unmasked exception occurs, the system may (1) update all exception status flags at block 230 (as per SSE rules) and (2) proceed with confidence to execution of the second instruction at block 240, knowing that no unmasked exceptions have occurred and therefore that the SSE rules will not be violated by executing (and possibly committing) the results of the operation on the high halves. At block 250, if an unmasked exception occurs on the high halves, operation is transferred to a micro-code handler 150 at block 220. However, at block 250, if no unmasked exceptions occur in the second instruction, (1) exception flags are updated at block 260 and (2) at block 270, the results of the operation on the high halves are safely committed to the XMM2_High register. At this point, it is known that results for the entire operation can be committed without violating the SSE rules—i.e., it is known that no unmasked exceptions will occur in either the low or high halves. Thus, at block 280, the third instruction is "re-executed" (having previously been executed as the first instruction) and the results of the operation on the low halves are committed to the XMM2_Low register.

2. Status Flags

In executing the above instructions, it may be the case that a masked post-execution exception occurs on the low half (i.e., occurs in executing the first instruction) and an unmasked pre-execution exception occurs on the high half (i.e., occurs in executing the second instruction). If this is the case, a masked post-execution exception flag will be raised in the register 130 because, even though results are not committed in the execution of the first instruction, status flags are updated. However, because an unmasked pre-execution exception occurs on the high half, raising this status flag will violate the SSE rule that if a pre-execution unmasked fault occurs, no post-execution flags can be raised.

To address this situation, a flag backup mechanism may be used. In the present system, register 170 of the floating point unit 70 is loaded with the exception flags before status flags are updated by the processor 20. Register 170 is then acting as a backup register and is 6-bits in width (one bit for each type of exception). When the computer system 10 determines that the above situation has occurred, an instruction may be issued that restores the exception flags to their previous state reflected in register 170. This instruction may dynamically decide which of the status flags to restore—each flag may be backed up independently.

C. Remarks

Two types of exceptions are "faults" and "traps." Traps, unlike faults, allow operation results to be committed. This would violate the SSE rule that results cannot be committed if an unmasked post-execution exception occurs. Thus, in some embodiments of the present invention, exceptions classified as traps may be re-classified as faults in the floating point unit 70 to ensure correct operation.

In many architectures, status flags are updated when a fault occurs. However, in one embodiment of the present invention, the associated hardware (e.g., the processor 20) does not update the status flags. Thus, in FIG. 4, at blocks 210 and 250, the status flags are not updated when an unmasked exception that is a fault occurs. This increases system speed efficiency and eliminates the necessity of additional code required to "backoff" or "undo" the status of the status flags should a fault occur in the execution of the first instruction at block 200 or the second instruction at block 240.

It may be seen that the present invention allows for successful emulation of the SSEs without the addition of excessive amounts of hardware or inefficient use of existing hardware and without consuming a large amount of clock cycles. In particular, by using the 3 micro-code instructions discussed above, implementing complicated shadow registers or register backoff mechanisms can be avoided.

In other embodiments, the present invention may be used to probe for exceptions (for any of a variety of reasons) without committing the results of operations. This aspect of the present invention may have a wide variety of applications, including, e.g., emulating different instruction or debugging a particular system.

It will also be readily apparent to those skilled in the art that innumerable variations, modifications, applications, and extensions of these embodiments and principles can be made without departing from the principles and spirit of the invention. For example, the techniques described herein may be used to emulate other instruction set extensions. The techniques described herein may also be use emulate the SSEs in systems having registers other than 82-bit registers for storing the four 32-bit SP floating point numbers of the SSE XMM registers. In another embodiment, the flag backup mechanism may be a selective one in which a system designer or an instruction selects which one or more of the status flags to backup for possible restoration.

Accordingly, it is intended that the scope of the invention be only limited as necessitated by the accompanying claims.

What is claimed is:

1. A method for probing for exceptions, comprising:

providing data to be operated upon;

executing a first instruction with respect to a first portion of the data without committing a result from the execution of the first instruction;

if no unmasked exceptions occur with respect to the first portion of the data, executing a second instruction with respect to a second portion of the data; and if no unmasked exceptions occur with respect to the second portion of the data, committing a result from the execution of the second instruction and re-executing the first instruction with respect to the first portion of the data, and committing.

2. The method of claim 1, further comprising:

invoking a handler if an unmasked exception occurs.

3. The method of claim 1, wherein exceptions have a status, the method further comprising:

storing a selected portion of the status of exceptions as they exist before executing the first instruction.

4. The method of claim 3, further comprising:

determining whether a masked post-computation exception has occurred when the first instruction is executed and an unmasked pre-computation has occurred when the second instruction is executed; and if the masked post-computation exception and the unmasked pre-computation have occurred, restoring some of the stored selected portion of the status of exceptions.

5. The method of claim 1, wherein exceptions may be traps of faults, the method further comprising reclassifying traps as faults.

6. The method of claim 1, wherein the method is implemented in a system emulating a streaming single-instruction multiple-data extensions instruction set.

7. A method of executing an instruction on a plurality of floating point numbers, comprising:

storing a first portion of the floating point numbers in a first register;

storing a second portion of the floating point numbers in a second register;

executing a first instruction with respect to the contents of the first register;

if no unmasked exception occurs with respect to the contents of the first register, executing a second instruction with respect to the contents of the second register;

if no unmasked exception occurs with respect to the contents of the second register, re-executing the first instruction with respect to the contents of the first register; and committing one or more of the results from the execution of the instructions with respect to the contents of the first register and the second register.

8. The method of claim 7, further comprising invoking an algorithm if the unmasked exception occurs.

9. The method of claim 7, further comprising storing a backup copy of a selected portion of a status of the unmasked exception as it exists prior to executing the instruction with respect to the contents of the first register.

10. The method of claim 9, further comprising:

determining whether any architectural rules have been violated after executing the instruction with respect to the contents of the second register and, if so, restoring the backup copy of the selected portion of status of the unmasked exception.

11. A method for executing a plurality of instructions on a set of data, comprising:

selecting whether an exception is an unmasked exception or a masked exception;

first determining whether a first one of a series of instructions will cause an unmasked exception with respect to a first portion of the data;

executing the first instruction with respect to the first portion of the data;

second determining whether a second one of the series of instructions will cause an unmasked exception with respect to a second portion of the data;

if no unmasked exceptions occur with respect to the first determining acts, executing the second instruction with respect to the second portion of the data;

if no unmasked exceptions occur with respect to the second determining act, committing a result from the execution of the second instruction and re-executing the first instruction with respect to the first portion of the data, and committing a result from the re-execution of the first instruction.

12. The method of claim 11, further comprising:

storing the status of exceptions prior to the first act.

13. A computer system comprising:

a processor comprising;

a floating point unit;

a ROM; and a plurality of floating point registers;

wherein the processor is configured to emulate an instruction set by:

performing a first operation on the contents of a first floating point register;

if no unmasked exception occurs with respect to the operation on the contents of the first floating point register, performing a second operation on the contents of a second floating point register, and if no unmasked exception occurs with respect to the operation on the contents of the second floating point register, performing the first operation on the contents of the first floating point register again.

14. The computer system of claim 13, wherein the first and second floating point registers are 82-bit registers.

15. The computer system of claim 13, wherein the contents of the first and second floating point register correlate to a streaming single-instruction multiple-data extensions XMM floating point register.

16. The computer system of claim 13, further comprising a register for updating the status of problems that occur during execution of an instruction.

17. The computer system of claim 13, further comprising a backoff register fro storing at least a portion of the status of problems that may have occurred prior to execution of instruction.

18. The computer system of claim 16, further comprising an instruction for restoring a selected subset of the status of problems.

* * * * *

UNITED STATES PATENT AND TRADEMARK OFFICE
CERTIFICATE OF CORRECTION

PATENT NO. : 6,681,322 B1
DATED : January 20, 2004
INVENTOR(S) : Kevin D. Safford et al.

It is certified that error appears in the above-identified patent and that said Letters Patent is hereby corrected as shown below:

Column 7,
Line 18, after "committing" delete period and insert -- a result from the re-execution of the first instruction. --

Column 8,
Line 58, delete "fro" and insert therefor -- for --

Signed and Sealed this

Thirty-first Day of May, 2005

JON W. DUDAS
*Director of the United States Patent and Trademark Office*